April 21, 1936.  J. W. HOOLEY  2,038,290
ELECTRICAL FIXTURE
Filed Jan. 28, 1935
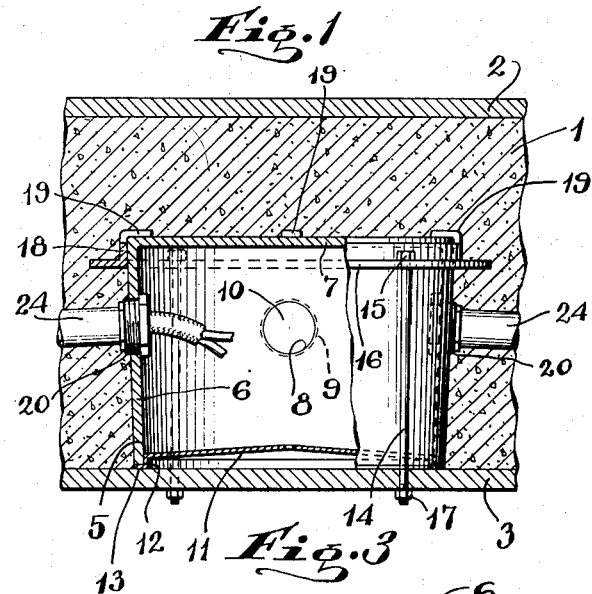
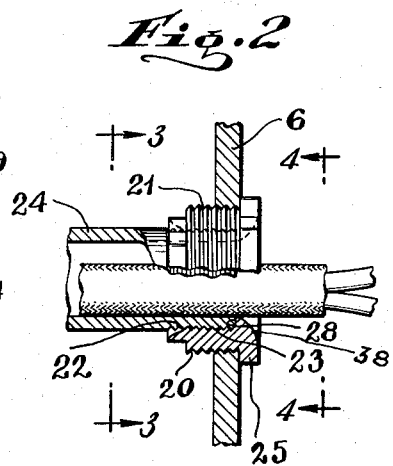
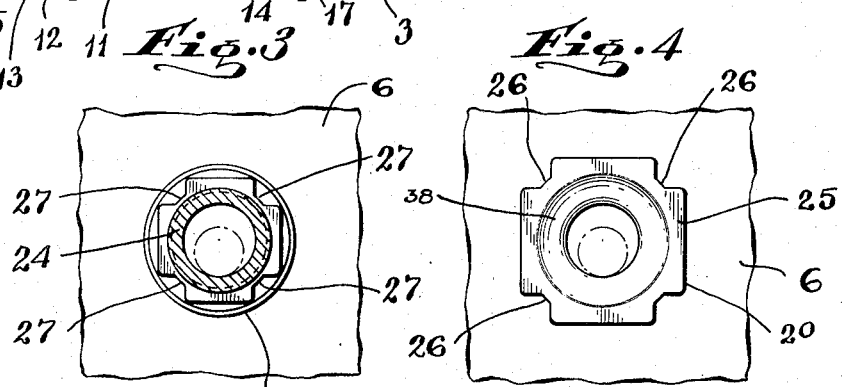
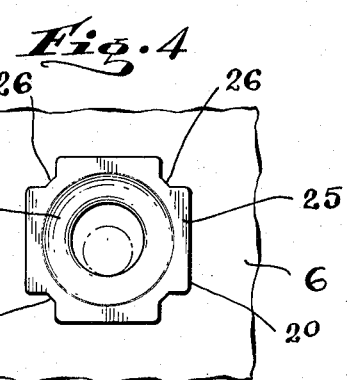
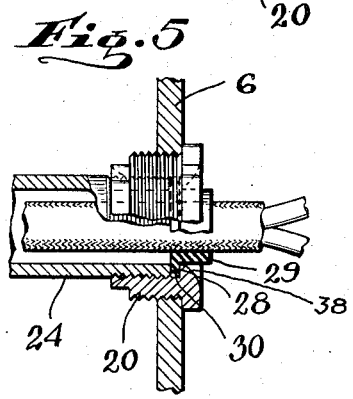
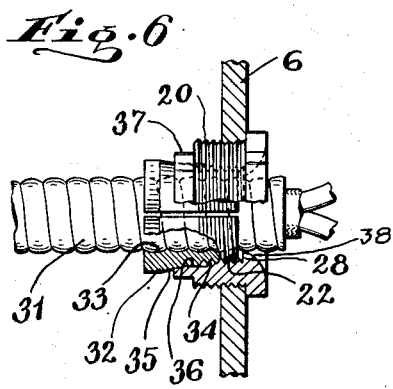
INVENTOR
JOHN W. HOOLEY
BY Gustav Drews
ATTORNEY Patented Apr. 21, 1936

2,038,290

UNITED STATES PATENT OFFICE 2,038,290

ELECTRICAL FIXTURE

John W. Hooley, Larchmont, N. Y.

Application January 28, 1935, Serial No. 3,694

7 Claims. (Cl. 247—25)

This invention relates to electrical fixtures in general and more especially to electrical fixtures in combination with outlet boxes, junction boxes and the like.

Among the objects of the present invention, it is aimed to provide an improved electrical fixture including a junction box, and a bushing for association with conduits, armored cable, metal raceways, enclosures for wires and the like which will effectively provide an uninterrupted continuous grounded connection for the system.

It is still another object of the present invention to provide an improved electrical fixture including an outlet box, junction box and the like, and one or more bushings which can be associated with one or more conduits, armored cable, metal raceways, enclosures for wires and the like to effect an electrically and mechanically connected system, the parts of which can be produced at a minimum cost, the assembly of which can be effected at a minimum cost of labor, and which system will be highly flexible so that the conduits and the like can either quickly and effectively be connected to the outlet box or disconnected and the position of the box changed without materially disturbing if at all the position of the conduits.

Specifically, it is an object of the present invention to provide an improved electrical fixture including an outlet box having a threaded opening and a bushing having an outer thread for cooperating with the outlet box and an inner thread for cooperating with a conduit including tool receiving conformations at the ends thereof for engaging and turning the bushing.

It is still another object of the present invention to provide an improved electrical fixture including an outlet box having one or more bushings for association with a conduit to produce a mechanically and electrically bonded system having joints that are vapor-proof, gas-proof and water-proof and which parts can be connected without moving or rotating either box or conduit.

It is still another object of the present invention to provide an improved electrical fixture including an outlet box having one or more bushings each for association with a conduit to produce an uninterrupted continuous grounded connection for the system and thus positively protect the system from a haphazard loose connection.

It is still another object of the present invention to provide an improved electrical fixture including an outlet box having one or more bushings each for association with a conduit to produce a metallically joined uninterrupted continuous electrical conductor which eliminates the necessity for bonding jumpers or such like devices to produce an effective compliance with the requirements of the National Electrical Code.

These and other features, capabilities and advantages of the invention will appear from the subjoined detail description of specific embodiments thereof illustrated in the accompanying drawing in which Figure 1 is a transverse section of a wall equipped with one embodiment of the present invention;

Fig. 2 is an enlarged fragmental detail of the main part of the fixture;

Fig. 3 is a section on the line 3—3 of Fig. 2;

Fig. 4 is a section on the line 4—4 of Fig. 2;

Fig. 5 is an enlarged fragmental detail similar to that illustrated in Fig. 2 of another embodiment; and Fig. 6 is an enlarged fragmental detail similar to that illustrated in Fig. 2 of still another embodiment.

In the embodiment illustrated in Figs. 1, 2, 3 and 4, there is shown a wall structure in the process of formation with the concrete 1 enclosed by the form boards 2 and 3. To the form board 3, there is secured in the present instance a junction box 5 composed of cast metal and having a conical wall member 6 and a base 7 integral with one another. The base 7 and wall 6 as shown in Fig. 1 are formed to have substantially the same thickness throughout, in order to prevent distortion by twisting or strains during annealing. As shown in Fig. 1, the conical wall 6 tapers inwardly as it recedes from the base 7.

In the conical wall 6 in the present instance there are provided a plurality of outlets 8, the inner edge of each being cut with an internal screw thread 9. These outlets during shipments are preferably closed by a temporary soft metal disc 10 which can be quickly and easily removed on the job. The narrow end of the wall 6 in the present instance is enclosed by a flexible spring metal cover 11 having an annular offset 12 adjacent its outer flange 13 which engages the outer edge of the wall 6. During shipment, the fittings supplied with each junction box are enclosed in the same and protected against displacement by the cover 11.

The box 5 in the present instance is secured to the form board 3 by the long bolts 14, the heads 15 of which engage the annular ring 16 through which the bolts 14 extend to and through the form board 3 to be secured at the outer face of the form board 3 by the nuts 17.

The annular ring 16 in the present instance has an inner cylindrical portion 18 having an inner periphery greater than the outer periphery of the wall 6 at its narrow end but not greater than the outer periphery of the wall 6 at its larger end so that the cylindrical portion 18 may snugly engage the large end of the wall 6 adjacent to the base 7. The cylindrical portion 18 also is provided with fingers 19 which may be bent over onto the base 7 as indicated in Fig. 1 after the ring 16 has been pressed into place on the wall 6.

On the job, the outlets 8 to be used are cleared of the discs 10 to receive the bushings 20. The bushings 20 constitute a main part of the present invention, each having an external screw threaded formation 21 to engage the thread 9 of an outlet and an inner screw threaded formation 22 to engage the external screw threaded formation 23 formed on the conduit 24. The bushings 20 in addition each have an enlarged shoulder portion 25 to abut, see Fig. 2, the inner face of the wall 6. The shoulder 25 is cut away at 26 to receive a wrench or other tool for turning the bushing into or out of engagement with the wall 6 and/or conduit 24. The other end of each bushing, see Fig. 3, is provided with a number of cut away portions 27 to receive a wrench or other tool for turning the bushing into or out of engagement both with the conduit 24 and wall 6.

By means of this bushing, it will thus appear that neither the conduit nor the box need be turned or twisted while the conduit is connected to the box 5 by the bushing 20 and that the bushing 20 need alone be turned.

It will also appear from this connection that the conduit will be both mechanically and electrically connected to the box 5 so that if the system consists of junction boxes and conduits connected by this type of bushing 20, the entire system will be mechanically connected and metallically joined into an uninterrupted electrical conductor available for an effective grounding connection.

It will also appear from the foregoing that the joints between the conduits and the junction boxes will be vapor-proof, gas-proof and water-proof and that the junction boxes at the same time may be disconnected from the conduits at will without materially disturbing, if at all, the position of the junction boxes and conduits during the process of removal.

It will also appear from the foregoing that in a system consisting of junction boxes made according to the present invention and connected to conduits by bushings made according to the present invention, the same will be protected from the dangers resulting during the construction period of a job where one portion of a building might be completed and another one exposed or even after the building is completed and one room warmer than another in that the system will be sealed tight to eliminate the possibility of condensation and moisture.

Preferably as shown in Fig. 2, the bushing 20 also has an inner shoulder 28 to form a limiting stop for the end of the conduit 24 and a rounded surface 38 extending from the inner periphery of the shoulder 28 outwardly.

When desired as shown in the embodiment of Fig. 5, an insulated bushing 29 may be introduced with its cylindrical portion extending into the box 5 and its annular shoulder 30 disposed between the shoulder 28 of the bushing 20 and the end of the conduit 24.

When a flexible metallic cable 31 is used instead of the metal conduit 24, a split fitting 32 may be introduced between the bushing 20 and the metallic cable 31. The split fitting 32, as shown in Fig. 6, consists of complemental portions having inner threaded convolutions 33 to cooperate with the internal convolutions of the metallic cable 31. The complemental portions of the split fitting 32 also have external threads 34 to engage the internal threads 22 of the bushing 20. Preferably as shown the complemental portions of the fitting 32 are tapered in cross-section with a conical face 35 to engage the conical face 36 of the annular extension 37 of the bushing 20 in which the cut away portions 27 are formed.

The outer face of the enlarged end of the fitting 32 is preferably angular to facilitate engagement by a wrench or other tool to turn the same into place whereupon the cooperation of the opposing faces 35 and 36 will securely anchor the metallic cable 31 in the bushing 20.

It is obvious that various changes and modifications may be made to the details of construction without departing from the general spirit of the invention as set forth in the appended claims.

It is also obvious that while the conformation of the junction box or outlet box 5 may be material for certain features hereinbefore disclosed, the box may assume any number of other shapes within the purview of the invention and similarly that this junction box may be provided with openings other than those disclosed for the purpose of accommodating switches, receptacles, fixtures and the like without departing from the general scope of the invention.

I claim:

1. The combination with a junction box having an internally screw threaded opening, of a conduit having an externally screw threaded formation adjacent its end, and a bushing having an externally screw threaded formation to engage the threaded formation of said opening and an internally threaded formation to engage the threaded formation of said conduit, said bushing also having an enlargement at one end providing an inner shoulder adapted to oppose the end of said conduit as a stop and a rounded surface extending away from the inner periphery of said shoulder in an outward direction whereby all such sharp interruptions and corners will be eliminated from engagement by the cable or the like passed through said conduit and bushing into said box.

2. The combination with a metal junction box having an internally screw threaded opening, of a metal conduit having an externally screw threaded formation adjacent its end, and a metal bushing having an externally screw threaded formation to engage the threaded formation of said opening and an internally threaded formation to engage the threaded formation of said conduit, said bushing also having a tool engaging formation extending laterally therefrom whereby the bushing may be engaged to be turned relative to said box and conduit to connect said box and conduit to one another and which formation further engages the wall of said box in connected position thereby serving as a brace and in addition forming a water-tight and vapor-proof connection.

3. The combination with a metal junction box having an internally screw threaded opening, of a metal conduit having an externally screw threaded formation adjacent its end, and a metal bushing having an externally screw threaded formation to engage the threaded formation of said opening and an internally threaded formation to engage the threaded formation of said conduit, said bushing also having tool engaging formations at both of its ends whereby the bushing may be engaged and turned both from the inside and from the outside of said box relative to said box and conduit to connect said box and conduit to one another or disconnect said box and conduit from one another.

4. The combination with a metal junction box having an internally screw threaded opening, of a metal conduit having an externally screw threaded formation adjacent its end, a metal bushing having an externally screw threaded formation to engage the threaded formation of said opening and an internally threaded formation to engage the threaded formation of said conduit, said bushing also having an outer and an inner shoulder forming enlargement at one end and an extension at the other end, and an insulated bushing having a cylindrical portion and an outwardly extending flange, said cylindrical portion extending across said inner shoulder into said box and said flange disposed between said inner shoulder and the end of said conduit, said outer shoulder forming an abutment for the inner face of said box and embracing a tool engaging formation to facilitate turning said bushing from the inside of said box and said extension embracing a tool engaging formation to facilitate turning said bushing from the outside of said box.

5. The combination with a metal junction box having an internally screw threaded opening, of a metal conduit having an externally convoluted formation, a metal bushing having an externally threaded formation and an internally threaded formation, and a split fitting having externally threaded convolutions and internal convolutions, the externally threaded formations of said fitting engaging the internally threaded formation of said bushing and the internal convolutions of said fitting engaging the externally convoluted formation of said conduit, said fitting being tapered to facilitate locking said conduit to said bushing when turned into place, the externally threaded formation of said bushing engaging the internally threaded formation of said box, said bushing also having an inwardly extending shoulder adapted to oppose the end of said fitting and said conduit extending through said fitting and bushing into said box whereby the cable or the like passed through said conduit will be protected from all sharp interruptions and corners of, and between, said split fitting and said bushing.

6. A bushing for a junction box having an internally threaded formation for threaded engagement with the part to be connected to the junction box, an outer threaded formation for threaded engagement with the box, and an enlargement having outwardly and inwardly extending shoulders at one end and an extension at the other end, said enlargement and said extension embracing tool engaging formations to facilitate turning said bushing both from the inside and from the outside of said junction box, said shoulders forming limiting stops to determine the limit of movement of said bushing relative to the box and part to be connected to one another by said bushing.

7. The combination with a metal junction box having an internally screw threaded opening, of a metal bushing having an externally threaded formation for threaded engagement with the internally threaded formation of said junction box, said bushing also having an internally threaded formation for threaded engagement with the part to be connected to said junction box and also an enlargement including outwardly and inwardly extending shoulders at one end, said shoulders forming limiting stops to determine the limit of movement of said bushing relative to the box and part to be connected to one another by said bushing.

JOHN W. HOOLEY.